US 6,658,562 B1

(12) United States Patent
Bonomo et al.

(10) Patent No.: US 6,658,562 B1
(45) Date of Patent: Dec. 2, 2003

(54) METHOD, SYSTEM, AND PROGRAM FOR CUSTOMIZING A BASIC INPUT/OUTPUT SYSTEM ("BIOS") CONFIGURATION ACCORDING TO THE TYPE OF USER

(75) Inventors: Ralph Bonomo, Cary, NC (US); Richard Alan Dayan, Wake Forest, NC (US); Joseph Wayne Freeman, Raleigh, NC (US); Robert Duane Johnson, Raleigh, NC (US); Diane Nolterieke, Stewart, FL (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 09/649,440

(22) Filed: Aug. 25, 2000

(51) Int. Cl.[7] .................................................. G06F 9/24
(52) U.S. Cl. .............................................. 713/1; 713/2
(58) Field of Search ......................................... 713/1, 2

(56) References Cited

U.S. PATENT DOCUMENTS

| | | | |
|---|---|---|---|
| 5,375,210 A | | 12/1994 | Monnes et al. |
| 5,535,321 A | * | 7/1996 | Massaro et al. ............ 345/707 |
| 5,535,371 A | | 7/1996 | Stewart et al. |
| 5,696,968 A | | 12/1997 | Merkin |
| 5,860,139 A | | 1/1999 | Martin |
| 5,883,801 A | | 3/1999 | Drucker et al. |
| 5,892,906 A | * | 4/1999 | Chou et al. ................. 713/202 |
| 5,933,652 A | * | 8/1999 | Chen et al. ..................... 710/1 |
| 6,098,158 A | * | 8/2000 | Lay et al. .................... 711/162 |
| 6,161,178 A | * | 12/2000 | Cromer et al. ................. 713/2 |
| 6,321,332 B1 | * | 11/2001 | Nelson et al. .................. 713/2 |
| 6,446,203 B1 | * | 9/2002 | Aguilar et al. .................. 713/2 |
| 6,484,262 B1 | * | 11/2002 | Herzi ........................... 713/201 |
| 6,490,677 B1 | * | 12/2002 | Aguilar et al. .................. 713/1 |

FOREIGN PATENT DOCUMENTS

| | | | | |
|---|---|---|---|---|
| EP | 432333 A1 | * | 6/1991 | ............ G06F/1/00 |
| WO | WO 9308532 A2 | * | 4/1993 | ........... G06F/13/40 |

OTHER PUBLICATIONS

"Method for Automatically Selecting Correct BIOS Code to Support Network Initial Program Load from Remote Systems that Use Different Network Protocols". 1997. IBM Technical Disclosure Bulletin. vol. 40, Issue 10. pp. 167–168.*

* cited by examiner

*Primary Examiner*—Thomas Lee
*Assistant Examiner*—Eric Chang
(74) *Attorney, Agent, or Firm*—Bracewell & Patterson LLP (57) ABSTRACT

A method, system, and program for selecting and implementing a basic input/output system ("BIOS") configuration among various BIOS configurations for a data processing system are disclosed. Different BIOS configurations are defined for various types of users, such as a home user, a commercial user, and a network user. Each of the BIOS configurations includes a different set of BIOS characteristics, such as program setup features security features, and network server features, under which the data processing system is able to run. The different BIOS configurations are stored into a memory device for the data processing system. A designation is set within the memory device that directs a processor of the data processing system to select and execute a desired one of the BIOS configurations for a particular type of user.

22 Claims, 5 Drawing Sheets

METHOD, SYSTEM, AND PROGRAM FOR CUSTOMIZING A BASIC INPUT/OUTPUT SYSTEM ("BIOS") CONFIGURATION ACCORDING TO THE TYPE OF USER

BACKGROUND OF THE INVENTION

1. Technical Field:

The present invention relates in general to data processing systems, and, in particular, to a system, method, and program for selecting and implementing a basic input/output system ("BIOS") configuration for a data processing system. Still more particularly, the present invention relates to a system, method, and program for selecting and implementing one of a plurality of BIOS configurations for a data processing system according to a user type.

2. Description of the Related Art:

A basic input/output system ("BIOS") is an essential software component of a conventional desktop computer system. BIOS includes detailed information of the computer hardware system and serves as the intermediary between the hardware and the operating system software of the computer system. BIOS contains frequently used routines, instructions, and data for interfacing with key peripherals, for interrupt handling, for data transfer between hardware components, and for setup of various system features, such as application setup features, security features, and remote management features.

BIOS is typically stored in a non-volatile read-only memory ("ROM") device so that BIOS is executed when the computer is turned on. BIOS generally defines a single personality or individuality of a computer system. BIOS is generally limited to a programmed configuration for a single type of user. Different BIOS programs are required for various types of users, such as home users, commercial users, and network users (i.e., users of computer systems in a networked or distributed computing environment).

Conventionally, to support multiple types of users, computer manufacturers have had to develop multiple versions of BIOS, each tailored to the preferences and requirements of the associated type of user. The appropriate system board is selected, installed, and setup in the data processing system for the desired type of user. Thus, the manufacturing process requires the manufacturer to tailor the appropriate system board with the BIOS for the desired type of user.

To avoid the cost of manufacturing computers with multiple different BIOS configurations, an alternative way of providing the appropriate BIOS for multiple types of users is to manufacture a single system board for the data processing system. An initial BIOS program is stored in ROM on the system board. When the computer system is deployed, the BIOS can then be programmed or replaced with the appropriate BIOS for the intended user. This alternative way of providing BIOS avoids additional manufacturing costs but requires extra work and time on the part of the manufacturer or field service technician to configure the computer system.

The flexibility of providing BIOS that behaves differently for various types of users in a single piece of hardware does not exist. The present invention recognizes the need to flexibly provide BIOS for various types of users as well as to eliminate or reduce the additional hardware, costs, and inconvenience associated with accommodating different BIOS implementations for different types of users.

SUMMARY OF THE INVENTION

A method, system, and program for selecting and implementing a basic input/output system ("BIOS") configuration among various BIOS configurations for a data processing system are disclosed. Different BIOS configurations are defined for various types of users, such as a home user, a commercial user, and a network user. Each of the BIOS configurations includes a different set of BIOS characteristics, such as program setup features, security features, and network server features, under which the data processing system is able to run.

The different BIOS configurations are stored into a memory device for the data processing system. A designation is set within the memory device that directs a processor of the data processing system to select and execute a desired one of the BIOS configurations for a particular type of user. In a preferred embodiment, unique flag values are assigned for the different types of users, and a flag field is set within the memory device to designate the flag value assigned to the intended user type. The data processing system executes and operates under the BIOS configuration for the particular type of user based on the flag value of the flag field.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
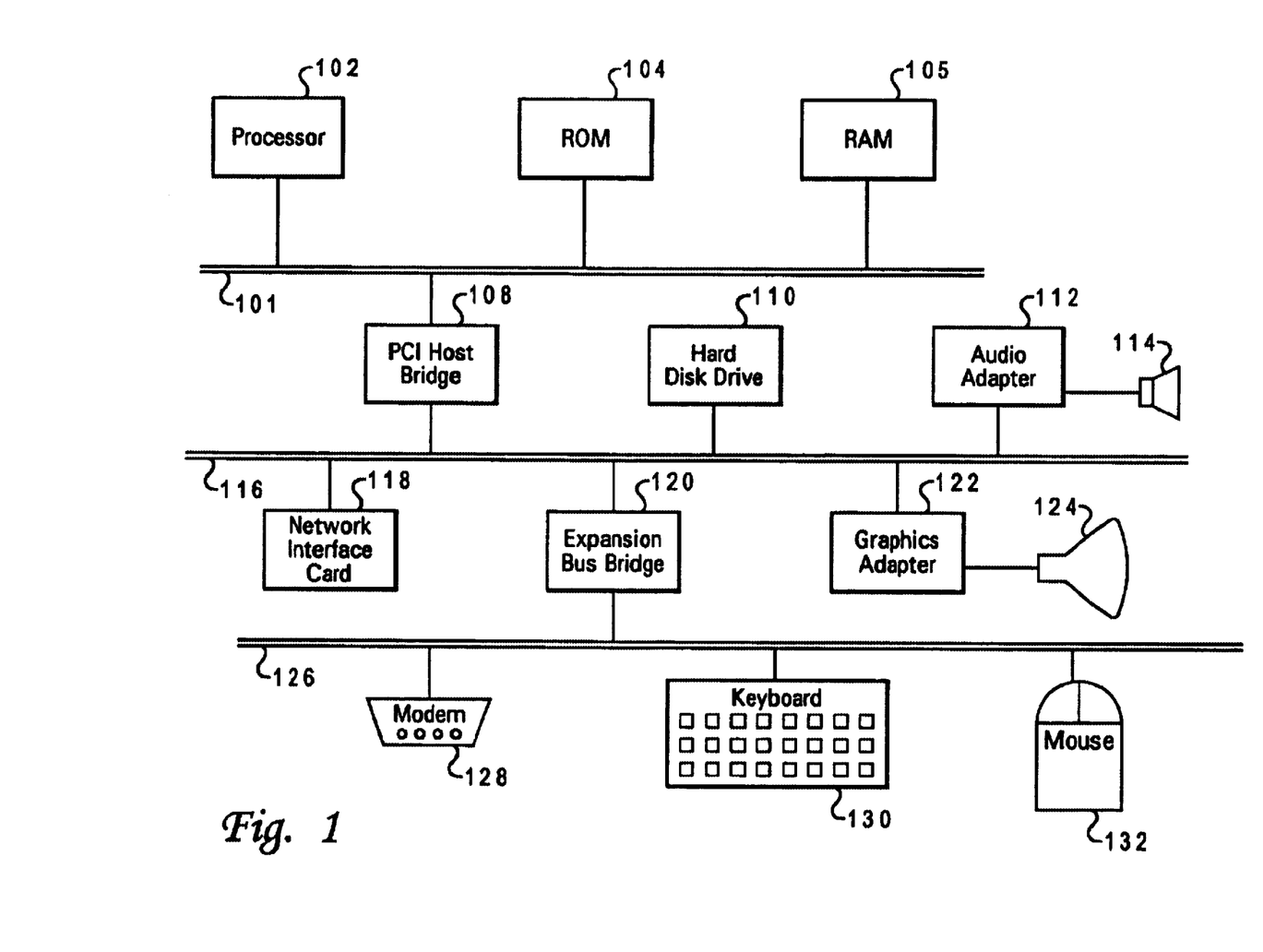
FIG. 1 is a hardware block diagram of an exemplary data processing system that selects and executes a basic input/output system ("BIOS") configuration for a particular type of user in accordance with the present invention.

With reference now to FIG. 1, an exemplary block diagram of a data processing system 100 that selects and executes a BIOS configuration for a particular type of user in accordance with the present invention is shown. The illustrative embodiment depicted in FIG. 1 may be a personal computer system, a workstation, or a server computer system such as the RS/6000® manufactured by International Business Machines Corporation (IBM) of Armonk, N.Y. However, as will become apparent from the following description, the present invention is also applicable to any other data processing system.

As illustrated in FIG. 1, data processing system 100 includes a processor 102, a read-only memory (ROM) 104, and a Random Access Memory (RAM) 105 connected to a system bus 101. System bus 101 is coupled to a Peripheral Connect Interface ("PCI") bus 116 of data processing system 100 through a PCI host bridge 108. PCI host bridge 108 provides a low latency path through which processor 102 may directly access PCI devices mapped anywhere within bus memory and/or I/O address spaces. PCI host bridge 108 also provides a high bandwidth path allowing PCI devices to directly access RAM 105.

A disk drive 110 may be attached to PCI bus 116. In addition, an audio adapter 112 and a graphics adapter 122 may be attached to PCI bus 116. Graphics adapter 122 controls visual output through a display monitor 124 and audio adapter 112 controls audio output through a speaker 114. Also attached to PCI bus 116 is a network interface card 118. Expansion bus bridge 120, such as a PCI-to-Industry Standard Architecture ("ISA") bus bridge, may be utilized to couple an ISA bus 126 to PCI bus 116. As shown, a modem 128, a keyboard 130, and a mouse 132 may be attached to ISA bus 126 to perform well-known basic I/O functions.

Figure 2:
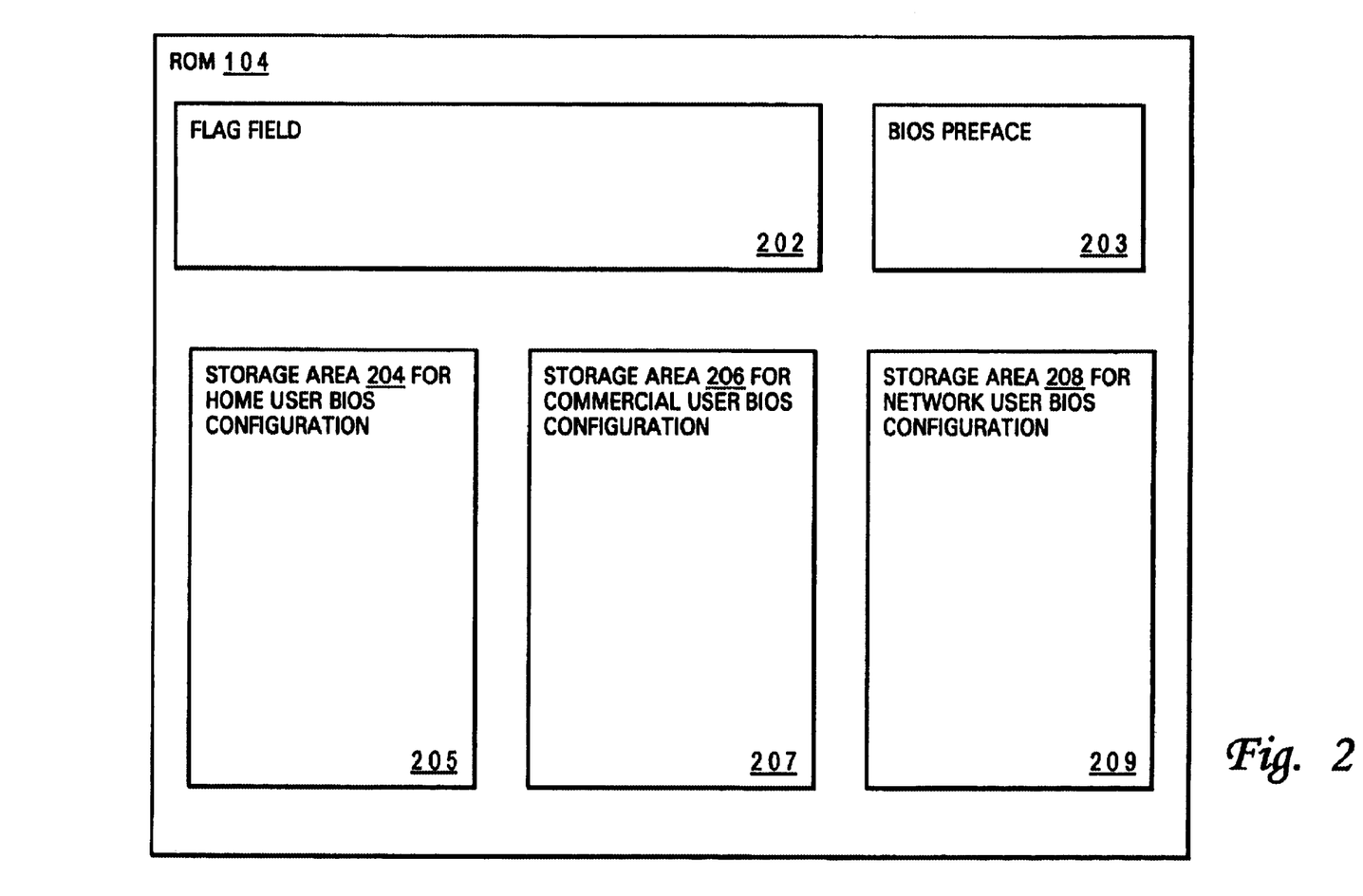
FIG. 2 is a block diagram of a memory device in the data processing system of FIG. 1, which stores multiple diverse BIOS configurations in accordance with the present invention.

Referring now to FIG. 2, an exemplary block diagram of ROM 104 in data processing system 100 of FIG. 1 is shown. ROM 104 stores three different BIOS configurations 205, 207, and 209 (e.g., a BIOS configuration for the home user, a BIOS configuration for the commercial user, and a BIOS configuration for the network user) among which data processing system 100 is able to select for execution. BIOS configurations 205, 207, and 209 for the home user the commercial user, and the network user are stored in storage areas 204, 206, and 208, respectively. ROM 104 has a flag field 202 that is set with a flag value to indicate under which one of the three BIOS configurations 205, 207, and 209 data processing system 100 boots and executes. ROM 104 also has a BIOS preface 203 containing a BIOS initialization code that data processing system 100 executes prior to executing a selected one of the three BIOS configurations 205, 207 and 209.

Data processing system 100 boots and executes under one of the BIOS configurations 205, 207, and 209 depending on the flag value of flag field 202. For example, when flag field 202 is set to the flag value "111111111", data processing system 100 accesses and boots under BIOS configuration 205 for the home user stored in storage area 204. For a home user, BIOS configuration 205 is generally simpler than BIOS configurations 207 and 209 for commercial and network users. The home user may not be as concerned with the security of data processing system 100 as would a commercial or network user.

In FIG. 2, BIOS configuration 205 for the home user includes a simple set of options for the BIOS setup program. Many of the options for BIOS configurations 207 and 209 are not present in home-user BIOS configuration 205. BIOS configuration 205 for the home user also contains an option for simple security features. The security features for the home user may simply involve a single user password. The user password may be needed for home-user BIOS configuration 205 to boot from any boot device on data processing system 100 or to allow the home user to view or change access to BIOS setup program. However, the password may not be needed for the home user to update or change the features and options of BIOS configuration 205. BIOS configuration 205 for the home user does not have any remote management capabilities or features.

When flag field 202 is set to the flag value of "10101010", then data processing system 100 accesses and boots under BIOS configuration 207 for the commercial user stored in storage area 206. Commercial-user BIOS configuration 207 is generally more sophisticated and complex than home-user BIOS configuration 205. However, commercial-user BIOS configuration is simpler than BIOS configuration 209 for the network user. The commercial user may be more concerned with data security than a home user, but may not be as concerned with security as a network user, who is typically concerned with security of data transmission between client and server systems.

BIOS configuration 207 for the commercial user includes a number of options for the BIOS setup program. Many of the options for the BIOS configuration for commercial users relate to security features. BIOS configuration 207 for the commercial user has an option for setting a medium level of security for data processing system 100. The option for BIOS configuration 207 may involve setting up multiple user passwords and one or more administrator passwords.

For example, in BIOS configuration 207 for the commercial user, a user password may be required to view information in the BIOS setup program. Even with the user password, the commercial user may still be unable to change the BIOS setup program. A user may use his/her password to boot from only certain devices, but an administrator password may be required in order to boot from all of the other devices (e.g., a user utilizing user password may boot from hard disk drive 110, but an administrator using an administrator password may boot from a floppy disk drive, a CD-ROM or ROM 104, or a network interface card 118). An administrator password may also be required to update or change BIOS configuration 207. If data processing system 100 is disconnected from the network of the commercial user and if configured in this manner, data processing system 100 halts and prevents restarting until an administrator enters an administrator password into data processing system 100. When an administrator password has been provided to data processing system 100, data processing system 100 may activate a system tamper detection algorithm to prevent or password restrict others from accessing parts or operations of data processing system 100.

BIOS configuration 207 for the commercial user has remote management capabilities. Data processing system 100 may boot up from a different device. The device under which data processing system 100 boots is determined from the source of power-up command (e.g., a power switch command causes data processing system 100 to boot from hard disk drive 110, while a power-up command from a network interface card 118 causes data processing system 100 to boot from a network coupled to network interface card 118).

When flag field 202 is set to the flag value "00000000", then data processing system 100 accesses and boots under BIOS configuration 209 for the network user stored in storage area 208. BIOS configuration 209 is generally more complex than BIOS configurations 205 and 207 for the home user and the commercial user since network users are typically more concerned with security issues as compared to home or commercial users.

BIOS configuration 209 for the network user includes a complex set of options for the BIOS setup program. BIOS setup options may include, for example, performing an extensive hardware test at power-on and background monitoring of error conditions. The security features for the network user involve multiple user passwords, one or more administrator passwords, and restricted access to setup functions. For example, the security features for the network user can include all of the security features for the commercial user as well as an additional security feature that prevents data processing system 100 from initializing and executing under an operating system. This additional security feature may involve rendering keyboard 130 of data processing system 100 useless until a password is typed in before data processing system 100 is able to proceed in running under the operating system. For example, such a security feature is designed for a networked system which normally does not have an administrator in attendance. Data processing system 100 may have to reboot and return to operation after a power failure, and this security feature prevents others from simply accessing data processing system by using keyboard 130.

BIOS configuration 209 for the network user also has remote management capabilities and features. Data processing system 100 can be operated from a different device or system. Also, BIOS configuration 209 for the network user also has the feature of providing remote notification of failures and problems to a network administrator via an administrator system.

Figure 3:
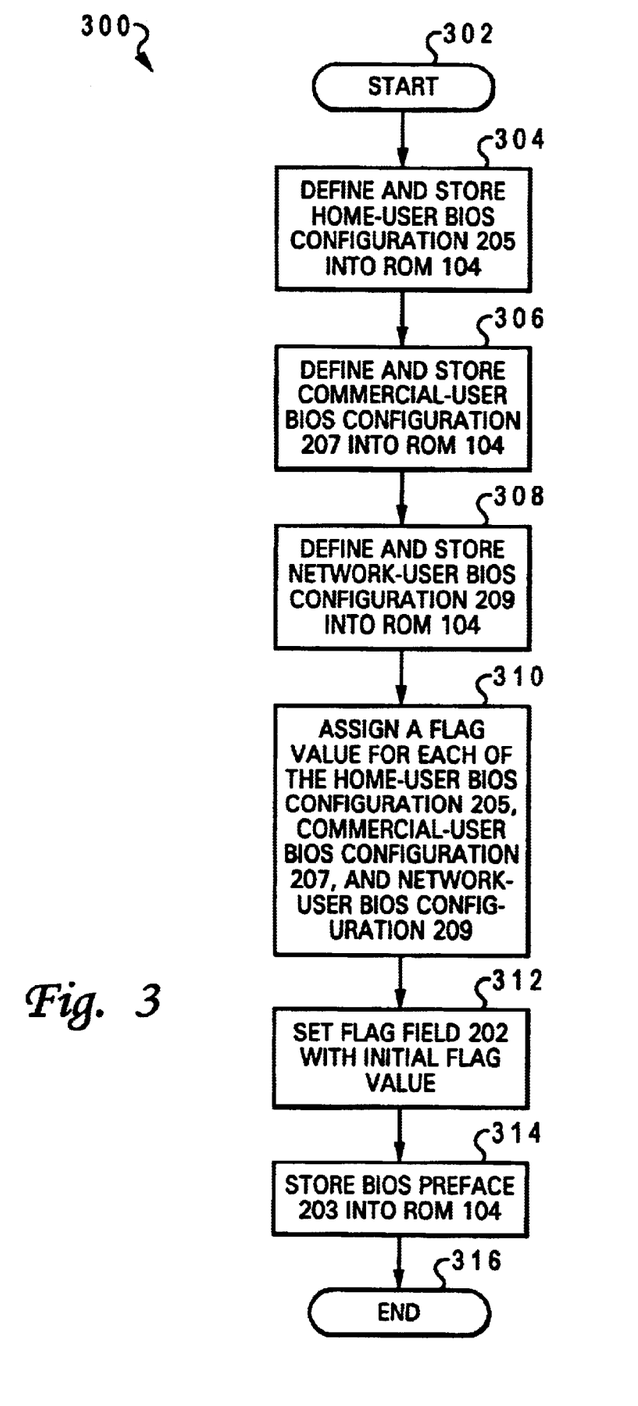
FIG. 3 is a flow chart of an exemplary method to install multiple diverse BIOS configurations into a read-only memory ("ROM") in accordance with the present invention.

With reference now to FIG. 3, a flow chart of an exemplary method 300 to install multiple diverse BIOS configurations into ROM 104 in accordance with the present invention is shown. Method 300 starts at block 302 and proceeds to block 304, which shows home-user BIOS configuration 205 being defined and stored into ROM 104. Method 300 next moves to block 306, which illustrates commercial-user BIOS configuration 207 being defined and stored into ROM 104. Following block 306, block 308 represents network-user BIOS configuration 209 being defined and stored into ROM 104.

Method 300 then proceeds to block 310, which shows that a flag value is assigned to each BIOS configuration (e.g., "11111111" or "10101010"or "00000000" assigned to home-user BIOS configuration 205, commercial-user BIOS configuration 207, and network-user BIOS configuration 209, respectively). Following block 310, method 300 moves to block 312, which shows flag field 202 being set with an initial flag value. Method 300 then moves to block 314, which depicts BIOS preface 203 being stored into ROM 104. Method 300 finally ends at block 316.

Figure 4:
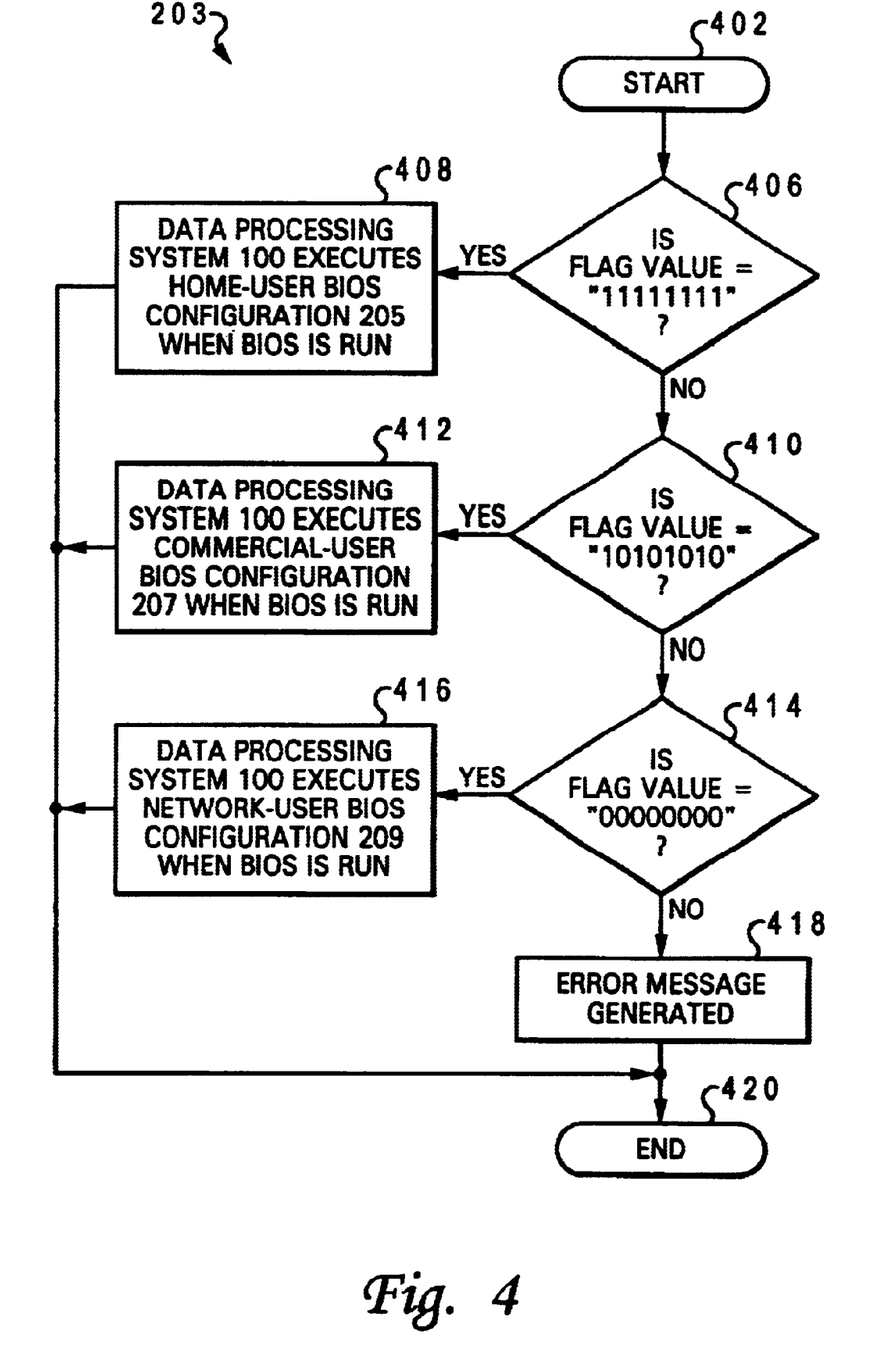
FIG. 4 is a flow chart of the execution of the BIOS preface and a selected BIOS configuration in accordance with the present invention.

Referring now to FIG. 4, a flow chart of the execution of BIOS preface 203 and a selected BIOS configuration in accordance with the present invention is shown. Prior to executing BIOS preface 203, a Power-On-Self-Test ("POST") is typically executed to begin initialization and operation of data processing system 100. Thereafter, BIOS preface 203 starts at block 402 and moves to decision block 406, which depicts a determination of whether the flag value in flag field 202 is flag value "11111111" for home-user BIOS configuration 205. If so, then BIOS preface 203 moves from decision block 406 to block 408. Block 408 illustrates data processing system 100 executing home-user BIOS configuration 205. BIOS preface 203 then ends at block 420. On the other hand, if the determination is made at decision block 406 that the flag value does not indicate a value for home-user BIOS configuration 205, then BIOS preface 203 proceeds from decision block 406 to decision block 410.

Decision block 410 shows a determination of whether the flag value loaded into flag field 202 is flag value "10101010" for commercial-user BIOS configuration 207. If so, then BIOS preface 203 moves from decision block 410 to block 412. Block 412 represents data processing system 100 executing commercial-user BIOS configuration 207. BIOS preface 203 then ends at block 420. However, if the determination is made at decision block 410 that the flag value is not for commercial-user BIOS configuration 207, then BIOS preface 203 moves from decision block 410 to decision block 414.

Decision block 414 illustrates a determination of whether the flag value loaded into flag field 202 is for network-user BIOS configuration 209. If a determination is made at decision block 414 that the flag value is for network-user BIOS configuration 209, then BIOS preface 203 proceeds from decision block 414 to block 416. Block 416 represents data processing system 100 executing network-user BIOS configuration 209. On the other hand, if a determination is made at decision block 414 that the flag value is not for network-user BIOS configuration 209, then BIOS preface 203 moves from decision block 414 to block 418. Block 418 shows data processing system 100 generating and displaying an error message regarding execution of BIOS. BIOS preface 203 then ends at block 420. After data processing system 100 successfully executes one of BIOS configurations 205, 207, and 209, data processing system 100 then executes an operating system loader to load and run data processing system 100 under an operating system.

Figure 5:
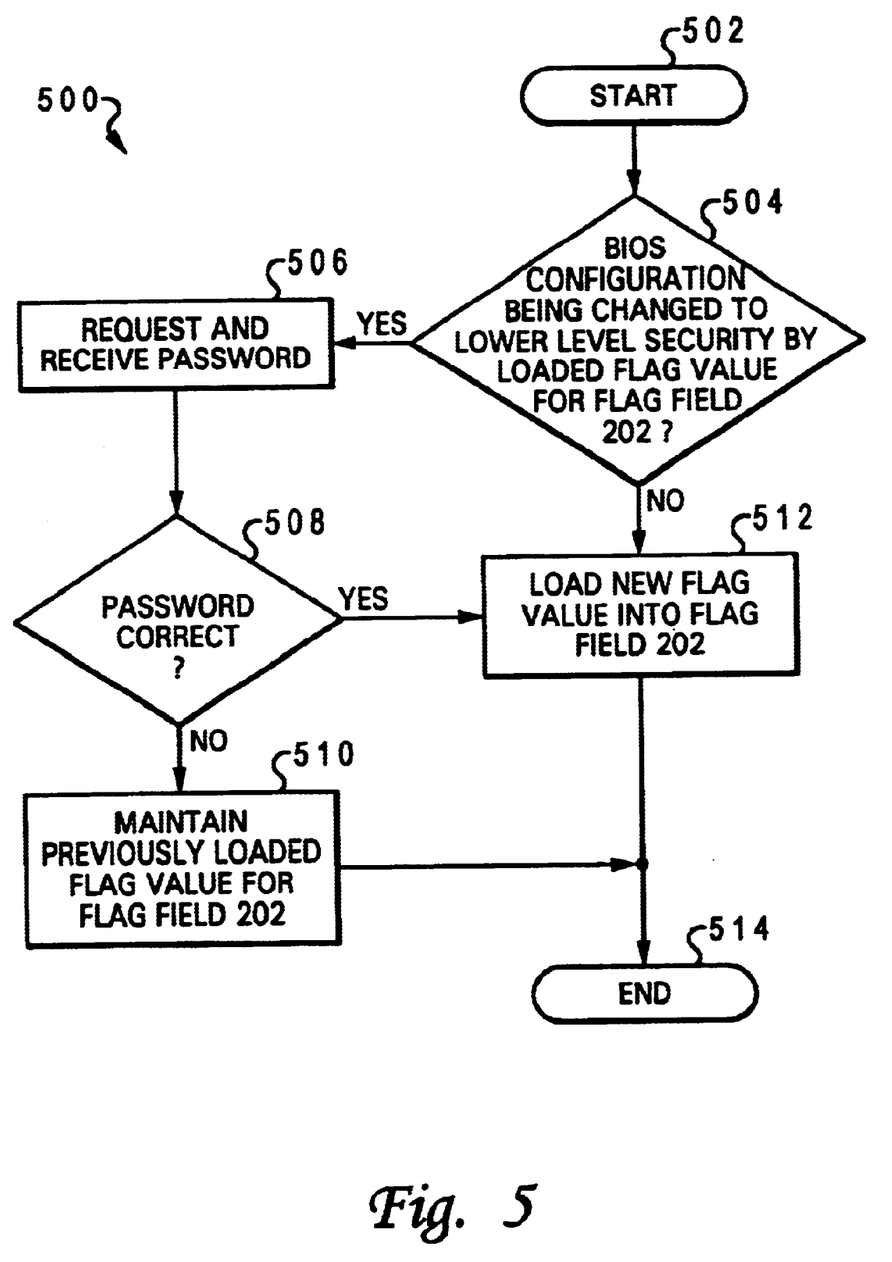
FIG. 5 is a flow chart of an exemplary method and program product steps, which are included in a BIOS utility stored in ROM, to prevent or secure the changing of the BIOS configuration from a BIOS configuration having a higher security level setting to a BIOS configuration having a lower security level setting.

With reference now to FIG. 5, a flow chart of an exemplary method and program product steps 500, which are included in a BIOS utility in ROM 104 to prevent or secure the changing of BIOS configuration from a BIOS configuration having a higher security level setting to a BIOS configuration having a lower security level setting, is shown. The method starts at block 502 and moves to decision block 504, which shows a determination of whether a request to change the BIOS configuration indicated by flag field 202 has been made that would alter the BIOS configuration from a higher level security to a lower level security. If the determination is made at decision block 504 that the BIOS configuration is not being changed from a higher level security to a lower level security, then the process passes to block 512. However, if a determination is made at decision block 504 that the BIOS configuration is being changed from a higher level security to a lower level security, then the process proceeds from decision block 504 to block 506. Block 506 represents data processing system 100 requesting and receiving a password from the person changing the BIOS configuration.

Following block 506, decision block 508 illustrates a determination being made by data processing system 100 as to whether the received password is correct. If the determination is made at decision block 508 that the received password is not correct, then the process moves from decision block 508 to block 510. Block 510 illustrates the previously loaded flag value for flag field 202 being maintained. The process thereafter ends at block 514. However, if a determination is made at decision block 508 that the received password is correct, off then the process proceeds from decision block 508 to block 512, which depicts loading a new flag value into flag field 202. The process thereafter ends at block 514. Data processing system 100 is generally required to be re-booted in order to reconfigure the BIOS configuration based on the new flag value defined in flag field 202.

Judicious selection of the flag values provides a convenient way to prevent the BIOS configuration from being changed from a BIOS configuration having a higher security level setting to a BIOS configuration having a lower security level setting. For example, data processing system 100 executes BIOS configuration 209 for the network user when flag field 202 is set with the flag value of "00000000", executes BIOS configuration 207 for the commercial user when flag field 202 is set with the flag value of "10101010", and executes BIOS configuration 205 for the home user when flag field 202 is set with the flag value of "11111111". In ROM technology, a "1" bit value may be changed to a "0" bit value, but a "0" bit value cannot be changed to a "1" bit value without a full erase procedure. The erase procedure is executed only when a password is provided to data processing system 100. Thus, BIOS configuration may only be changed from a higher security level to a lower security level when the password is provided to data processing system 100.

A system, method, and program for selecting and implementing a basic input/output system ("BIOS") configuration for a data processing system are disclosed. The present invention discloses in detail a system, method, and program for selecting and implementing a BIOS configuration among various BIOS configurations for a data processing system used by various types of users. The present invention provides flexibility in selecting and executing BIOS code that behaves differently for different types of users in a single piece of hardware. The present invention also flexibly provides such BIOS code on a generally single set of BIOS hardware for various types of users, and the present invention eliminates or at least reduces the additional hardware, costs, and inconvenience associated with accommodating various BIOS programs for different types of users. The present invention discloses an exemplary data processing system, BIOS memory device, BIOS configurations for various types of users, and designation for selecting and executing one of the BIOS configurations. The present invention is not limited in any way to any particular data processing system, memory device, BIOS configuration, type of user, designation for selection and execution of a BIOS configuration, and the present invention may be implemented with any suitable data processing system, BIOS memory device, BIOS configuration, type of user, and designation for selection and execution of a BIOS configuration.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for installing multiple basic input/output system ("BIOS") configurations into a memory device and for designating one of the BIOS configurations for execution by a data processing system, said method comprising:

storing multiple different BIOS configurations in a memory device for a data processing system;

storing a BIOS preface in said memory device;

setting a designation that directs a processor of the data processing system to execute one of the BIOS configurations upon startup following said BIOS preface; and in response to an attempt to change the designation from a BIOS configuration having a higher level security to a BIOS configuration having a lower level security, permitting a change in the designation only if a correct password is provided to the data processing system.

2. The method according to claim 1, wherein setting a designation further comprises:

setting a flag in a memory device in the data processing system.

3. The method according to claim 2, wherein setting a flag further comprises:

assigning a flag value for each of the BIOS configurations; and setting the flag with an initial flag value.

4. The method according to claim 1, wherein storing multiple different BIOS configurations further comprises:

storing a home-user BIOS configuration, a commercial-user BIOS configuration, and a network-user BIOS configuration in the memory device.

5. The method according to claim 4, wherein:

storing a home-user BIOS configuration further comprises storing home-user BIOS program setup features and home-user BIOS security features in the memory device;

storing a commercial-user BIOS configuration further comprises storing commercial-user BIOS program setup features, commercial-user BIOS security features, and commercial-user BIOS remote management features in the memory device; and storing a network-user BIOS configuration further comprises storing network-user BIOS program setup features, network-user BIOS security features, and network user BIOS remote management features in the memory device.

6. A method for selecting and executing a basic input/output system ("BIOS") configuration among various BIOS configurations stored in a memory device, said method comprising:

loading a value for a designation that directs a processor of a data processing system to execute a BIOS configuration among various BIOS configurations upon startup; and executing, by the data processing system, upon startup a BIOS preface and then executing a designated BIOS configuration among said various configurations based on the value for the designation; and in response to an attempt to change the designation from a BIOS configurations having a higher level security to another BIOS configuration having a lower level security, permitting a change in the designation only if a correct password is provided to the data processing system.

7. The method according to claim 6, wherein the loading and executing steps further comprise:

loading the value for the designation that directs the processor of the data processing system to execute a home-user BIOS configuration upon startup; and executing, by the data processing system, upon startup the home-user BIOS configuration.

8. The method according to claim 6, wherein the loading and executing steps further comprise:

loading the value for the designation that directs the processor of the data processing system to execute a commercial-user BIOS configuration upon startup; and executing, by the data processing system, upon startup the commercial-user BIOS configuration.

9. The method according to claim 6, wherein the loading and executing steps further comprise:

loading the value for the designation that directs the processor of the data processing system to execute a network-user BIOS configuration upon startup; and executing, by the data processing system, upon startup the network-user BIOS configuration.

10. A memory device, comprising:

multiple different basic input/output system ("BIOS") configurations;

a designation within the memory device that directs a processor of a data processing system to execute one of the BIOS configurations; and means, responsive to an attempt to change the designation from a BIOS configuration having a higher level security to a BIOS configuration having a lower level security, permitting a change in the designation only if a correct password is provided to the data processing system.

11. The memory device according to claim 10, wherein the designation further comprises:

a flag set in a memory device in the data processing system.

12. The memory device according to claim 11, further comprises:

a flag value assigned for each of the BIOS configurations; and wherein the flag is set with an initial flag value.

13. The memory device according to claim 10, wherein the different BIOS configurations further comprise:

a home-user BIOS configuration, a commercial-user BIOS configuration, and a network-user BIOS configuration.

14. The memory device according to claim 13, wherein:

the home-user BIOS configuration further comprises home-user BIOS program setup features and home-user BIOS security features;

the commercial-user BIOS configuration further comprises commercial-user BIOS program setup features, commercial-user BIOS security features, and commercial-user, BIOS remote management features; and the network-user BIOS configuration further comprises network-user BIOS program setup features, network-user BIOS security features, and network user BIOS remote management features.

15. The memory device according to claim 10, further comprising:

a BIOS preface.

16. A data processing system, comprising:

a processor; and a memory device coupled to the processor, wherein the memory device has stored therein:

multiple different basic input/output system ("BIOS") configurations;

a designation within the memory device that directs the processor to execute one of the BIOS configurations; and means, responsive to an attempt to change the designation from a BIOS configuration having a higher level security to a BIOS configuration having a lower level security, permitting a change in the designation only if a correct password is provided to the data processing system.

17. A circuit board, comprising:

a memory device having stored therein:

multiple different basic input/output system ("BIOS") configurations;

a designation within the memory device that directs the processor to execute one of the BIOS configurations;

means, responsive to an attempt to change the designation from a BIOS configuration having a higher level security to a BIOS configuration having a lower level security, permitting a change in the designation only if a correct password is provided to the data processing system; and a bus to which the memory device is coupled.

18. The circuit board according to claim 17, further comprising:

a processor coupled to the bus.

19. A program product for selecting and executing a basic input/output system ("BIOS") configuration among various BIOS configurations stored in a memory device, said program product comprising:

a control program encoded in a computer user medium that causes a data processing system to perform the steps of;

loading a value for a designation that directs a processor of the data processing system to execute a BIOS configuration among various BIOS configurations upon startup;

executing, by the data processing system, upon startup the BIOS configuration based on the value for the designation; and in response to an attempt to change the value of the designation from a value designating a BIOS configuration having a higher level security to a value designating a BIOS configuration having a lower level security, permitting a change in the designation only if a correct password is provided to the data processing system.

20. The program product according to claim 19, wherein the loading and executing steps further comprise:

loading the value for the designation that directs the processor of the data processing system to execute a home-user BIOS configuration upon startup; and executing, by the data processing system, upon startup the home-user BIOS configuration.

21. The program product according to claim 19, wherein the loading and executing steps further comprise:

loading the value for the designation that directs the processor of the data processing system to execute a commercial-user BIOS configuration upon startup; and executing, by the data processing system, upon startup the commercial-user BIOS configuration.

22. The program product according to claim 19, wherein the loading and executing steps further comprise:

loading the value for the designation that directs the processor of the data processing system to execute a network-user BIOS configuration upon startup; and executing, by the data processing system, upon startup the network-user BIOS configuration.

* * * * *